US008316101B2

(12) United States Patent
Ammerlaan et al.

(10) Patent No.: US 8,316,101 B2
(45) Date of Patent: Nov. 20, 2012

(54) RESOURCE MANAGEMENT SYSTEM FOR HOSTING OF USER SOLUTIONS

(75) Inventors: Michael Ammerlaan, Sammamish, WA (US); Silviu Ifrim, Redmond, WA (US); Kristofer D. Hoffman, Redmond, WA (US); Randy D. Thomson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 12/163,810

(22) Filed: Jun. 27, 2008

(65) Prior Publication Data

US 2009/0234941 A1  Sep. 17, 2009

Related U.S. Application Data

(63) Continuation-in-part of application No. 12/049,316, filed on Mar. 15, 2008.

(51) Int. Cl.
*G06F 15/16* (2006.01)
*G06F 15/173* (2006.01)

(52) U.S. Cl. ........ 709/217; 709/203; 709/224; 709/226; 705/39; 705/40; 705/43

(58) Field of Classification Search .................. 709/203, 709/224, 226, 217; 705/39, 40, 43
See application file for complete search history.

(56) References Cited

U.S. PATENT DOCUMENTS

| 6,108,703 | A | 8/2000 | Leighton et al. ............... 709/226 |
| 6,275,938 | B1 * | 8/2001 | Bond et al. ....................... 726/23 |
| 6,532,488 | B1 | 3/2003 | Ciarlante et al. |
| 6,816,882 | B1 | 11/2004 | Conner et al. |
| 7,050,963 | B2 | 5/2006 | Flavin |
| 7,178,143 | B2 | 2/2007 | Pugh et al. ..................... 717/170 |
| 7,194,543 | B2 | 3/2007 | Robertson et al. ............ 709/226 |
| 7,290,262 | B2 | 10/2007 | Blizniak et al. |
| 7,305,431 | B2 * | 12/2007 | Karnik et al. ................. 709/203 |
| 7,503,031 | B2 | 3/2009 | Chang et al. |
| 2002/0062377 | A1 | 5/2002 | Hillman |
| 2002/0178254 | A1 | 11/2002 | Brittenham et al. |

(Continued)

FOREIGN PATENT DOCUMENTS

WO   WO 01/63403 A2   8/2001
WO   WO 2004/071050 A1   8/2004

OTHER PUBLICATIONS

W. Yuxiang et al., "A New Approach for Distributed GIS," http://66.102.1.104/scholar?hl=en&lr=&q=cache:KSiq8b0VDyMJ:kepler.ia.ac.cn/seminar/ITFM/papers/itfm2001-paper25.pdf, Sep. 2001, 9 pgs. D.S. Meliksetian et al., "Design and Implementation of an Enterprise Grid," http://www.research.ibm.com/journal/sj/434/meliksetian.html, vol. 43, No. 4, 2004, 14 pgs.

(Continued)

*Primary Examiner* — Peter Shaw
(74) *Attorney, Agent, or Firm* — Merchant & Gould, P.C.

(57) ABSTRACT

Scalable hosting of user solutions is provided. A system for hosting application software includes a local server, one or more remote servers, a configuration database and a content database. The local server includes a web front end module that processes a request from a client computer over the Internet to host application software on a server. The web front end module determines whether the local server or the one or more remote servers will host the application software. The remote server includes a back end module that manages the installation and operation of application software hosted the remote server. The configuration database includes topology information that has descriptions of the server computers that can host application software. The content database includes information on the content of the software applications to be hosted on a server computer.

18 Claims, 10 Drawing Sheets

U.S. PATENT DOCUMENTS

| | | | |
|---|---|---|---|
| 2002/0194251 A1* | 12/2002 | Richter et al. | 709/105 |
| 2003/0105868 A1* | 6/2003 | Kimbrel et al. | 709/226 |
| 2003/0126202 A1 | 7/2003 | Watt | |
| 2003/0135509 A1 | 7/2003 | Davis et al. | |
| 2003/0208456 A1 | 11/2003 | Greenstein | |
| 2005/0044197 A1 | 2/2005 | Lai | |
| 2005/0086339 A1* | 4/2005 | Krishnan | 709/223 |
| 2005/0119955 A1 | 6/2005 | Dang et al. | 705/31 |
| 2005/0228856 A1* | 10/2005 | Swildens et al. | 709/200 |
| 2005/0278274 A1 | 12/2005 | Kovachka-Dimitrova et al. | |
| 2005/0283759 A1 | 12/2005 | Peteanu | |
| 2006/0075407 A1 | 4/2006 | Powers et al. | 718/100 |
| 2006/0080273 A1 | 4/2006 | Degenaro | |
| 2006/0136581 A1 | 6/2006 | Smith | 709/224 |
| 2007/0180018 A1 | 8/2007 | Srinivasan et al. | |
| 2007/0282992 A1 | 12/2007 | Liu | |
| 2009/0037428 A1 | 2/2009 | Achtermann et al. | |
| 2009/0144304 A1* | 6/2009 | Stephens et al. | 707/101 |
| 2009/0235353 A1 | 9/2009 | Ammerlaan | |

OTHER PUBLICATIONS

Jean-Claude Franchitti, "The Web Application Opportunity," http://www.nyu.edu/classes/jcf/g22.3033-005/handouts/g22_3033_011_h23.htm, Course No. g22.3033-011, Session 2, 17 pgs.

M. Wright, "DB2 Connection Routing Using Linux Load Balancing," http://www-128.ibm.com/developerworks/db2/library/techarticle/dm-0410wright/?ca=dgr-lnxw16Balance, Oct. 28, 2004, 10 pgs.

International Search Report and Written Opinion for PCT/US2009/034049 mailed Aug. 27, 2009, 10 pages.

U.S. Non-Final Office Action in U.S. Appl. No. 12/049,316 mailed Jun. 24, 2010, 16 pages.

U.S. Appl. No. 12/049,316, Amendment and Response filed Apr. 8, 2011, 16 pgs.

U.S. Appl. No. 12/049,316, Amendment and Response filed Sep. 24, 2010, 13 pages.

U.S. Appl. No. 12/049,316, Office Action mailed Dec. 8, 2010, 21 pgs.

Chinese 1st Office Action in Application 2009-801098625, mailed Feb. 13, 2012, 10 pgs.

* cited by examiner

FIG. 10

RESOURCE MANAGEMENT SYSTEM FOR HOSTING OF USER SOLUTIONS

RELATED APPLICATION

This patent application is a continuation-in-part of U.S. patent application Ser. No. 12/049,316, filed Mar. 15, 2008 and entitled "Scalable Hosting of User Solutions," which is incorporated herein in its entirety as if fully set out herein.

BACKGROUND

Increasingly software applications are being hosted on the Internet. Because customers frequently have specific requirements for their applications or need tailored customizations, there is a need to support custom software applications on the Internet. Therefore, Internet infrastructure providers need to be able to host a wide diversity of custom solutions and applications.

Security and performance are two factors that need to be considered by Internet infrastructure providers when hosting software applications. Because many software applications may be hosted on one computer, it is often difficult to ensure the reliability of the applications. One bad software application can contain malicious code that can compromise system security. In addition, a poorly designed software application can degrade system performance and impact other software applications running on the host computer.

SUMMARY

The present disclosure relates to a system and methods for hosting software application code on a local server and on remote servers in a secure and scalable manner.

According to one embodiment, a hosting system includes a local server, one or more remote servers, a configuration database and a content database. The local server includes a web front end module that processes client requests over the Internet to host application software on a server computer. The application software is typically customized to a user's business, for example, a doctor's office, and uploaded to the local server over the Internet. Each remote server includes a back end module that manages the installation and operation of application software hosted on that server.

The local server uses the resources of the configuration database and the content database to determine on which server the application software should be hosted. The application software may be hosted on the local server or it may be hosted on one of the remote servers. The selection of the hosting server is done in a manner to make the overall hosting solution scalable and secure.

According to another embodiment, a method for hosting application software on a server is provided. When a request is received from a client computer to run application software on a server where the application software is being uploaded from the client to a local computer, the software application is validated. A determination of a performance tier for the software application is made, a determination of a solution type for the software application is made, and a determination of a topology of available host computers is made. Using the performance tier, solution type and topology information along with a load balancing algorithm, a determination is made as to a server, either local or remote, on which the software application should run. The operation of the software application is monitored as it runs on the server.

According to another embodiment, a method for requesting software applications to be hosted on a server is provided. A request is initiated with a local server to host an application program on a server. A software application program is uploaded to the local server where the software application program includes customized features specific to an application solution. A load balancing algorithm is uploaded to the local server, and the load balancing algorithm provides a method for determining the server on which the software application should be hosted. A validation mechanism is uploaded to the local server, and the validation mechanism provides a method of determining whether the software application should be hosted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The accompanying drawings incorporated in and forming a part of the specification illustrate several aspects of the present disclosure, and together with the description, serve to explain the principles of the disclosure. In the drawings.

DETAILED DESCRIPTION

The present application is directed to systems and methods for hosting software applications in a scalable and secure manner. Software applications are run on remote hosts that are tiered by solution type and performance. The software applications are run in a sandboxed environment that limits the ability of potentially malicious software from impacting the resources of the host computer and of other software applications running on the host computer.

Figure 1:
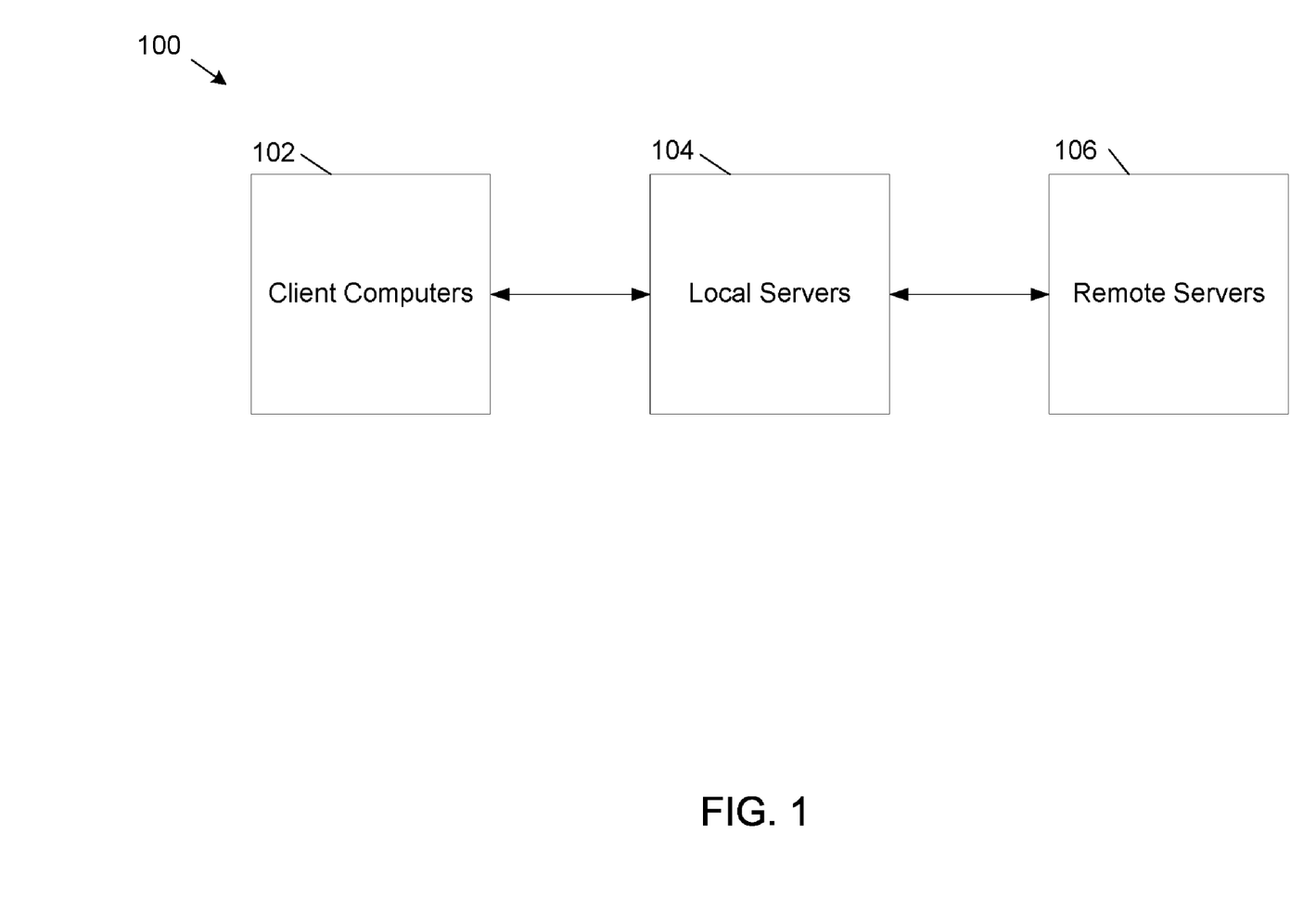
FIG. 1 shows an example system for hosting software applications on a server.

FIG. 1 shows an example computer system 100 including client computers (clients) 102, local servers 104 and remote servers 106. In an example embodiment, a client 102 uploads a custom software application to a local server 104 and requests that application software be hosted on a server. The local server 104 processes the request and determines which server is appropriate to host the application software. In some example embodiments, the local server 104 that receives the request will also host the application software. In other example embodiments, the local server 104 determines that the software application should be hosted on a remote server

106. The local server 104 makes this determination based on the solution type of the software application, the performance characteristics of the software application and the topology of the local servers and remote servers in the system. The end result is a scalable system where the system is load balanced so that similar performing software applications and software applications offering similar solution types are matched to a server and in which software overhead is minimized.

In an example embodiment, the local servers 104 and remote servers 106 are part of an Internet based collaboration and document management system such as MICROSOFT WINDOWS SHAREPOINT SERVICES (WSS). In another example embodiment, the local servers 104 and remote servers 106 are part of MICROSOFT OFFICE. In another example embodiment, a local server 106 is a MICROSOFT SHAREPOINT server. Other configurations are possible.

In example embodiments, a client 102 can be a personal computing device, such as a desktop or laptop computer, a personal data assistant, or a cellular telephone. A client 102 can include input/output devices, a central processing unit ("CPU"), a data storage device, and a network device. Typical input/output devices include keyboards, mice, displays, microphones, speakers, disk drives, CD-ROM drives, and flash drives. Computer readable media, such as the data storage device, provide for data retention. By way of example, computer readable media can include computer storage media and communication media. Computer storage media includes volatile and nonvolatile, removable and non-removable media implemented in any method or technology for storage of information such as computer readable instructions, data structures, program modules or other data. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Among the plurality of information stored on the data storage device is a client operating system ("OS") and client applications. The client OS is a program that manages the hardware and software resources of the client system. The client applications utilize the resources of a client 102 to directly perform tasks specified by the user. Other configurations for the clients 102 are possible.

Figure 2:
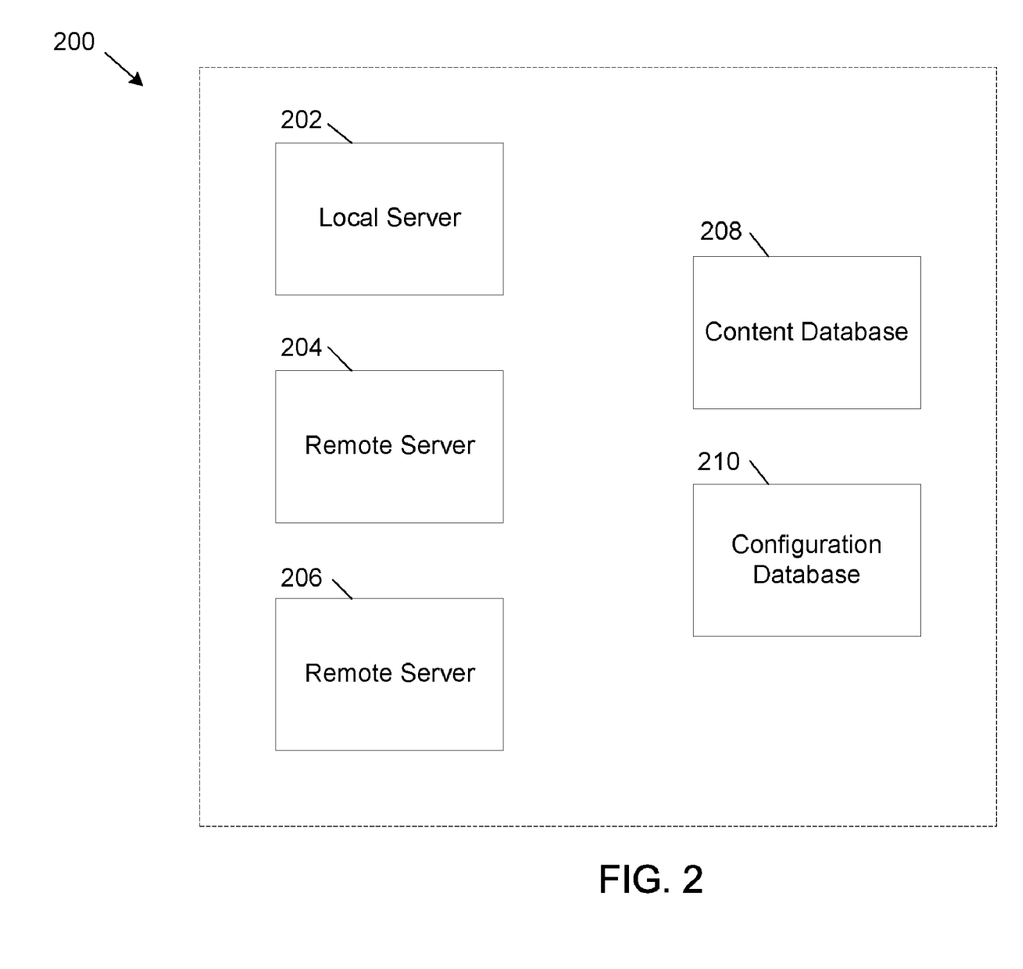
FIG. 2 shows another example system for hosting software applications on a server.

FIG. 2 shows an example system 200 for hosting software applications. The example system 200 includes local server 202, remote servers 204 and 206, content database 208 and configuration database 210. Local server 202 processes a request from a local client to host a software application. Local server 202 is illustrated in FIG. 2 as a single server, but it should be appreciated that numerous local servers 202 may be utilized to form a web farm of local servers. Thus, when the term server is used in any context herein, it should be understood to mean one or more servers that may be utilized as a combination or web farm of servers as capacity and performance needs dictate for any given system 200. Requests processed by the local server 202 often originate from businesses that want software applications tailored to their business made available to their customers over the Internet. Some example businesses are a dental office, a cleaner and a florist. The software applications to be hosted for these businesses can be classified into solution types. For example, a software application for a dental office has different characteristics than a software application for a florist. In addition, businesses having a common solution type often want to customize their software applications and add features specific to their business, for example to provide a specific display effect or to add custom controls or an event handler to handle specific business logic. Information regarding solution types for software applications used in the system is stored in content database 208 which may comprise one or more content databases.

When local server 202 processes the hosting request it makes a determination of where the software application should be hosted. This determination takes several factors into consideration. In a large scale system thousands of applications may be hosted. Because many of these applications have the same solution type, it enhances system efficiency if applications with a common solution type are hosted together. It also improves system efficiency if a software application is not hosted on the local server that processes requests from clients. To this end and to improve system scalability, software applications may be hosted on remote servers like remote servers 204 and 206. It will be understood that in a large scale system there may be thousands of remote servers but in the example system of FIG. 2 only two are shown.

Still referring to FIG. 2, configuration database 210 contains information on the topology of the system including the software solution being hosted on local server 202 and on remote servers 204 and 206. The content database 208 contains information on the solution type and on the performance characteristics of each solution type. Local server 202 uses information obtained from content database 208 and configuration database 210 in conjunction with a load balancing algorithm to determine whether the software application should be hosted on local server 202 or on remote servers 204 and 206. Once this determination is made, local server 202 routes the software application to the appropriate destination.

Figure 3:
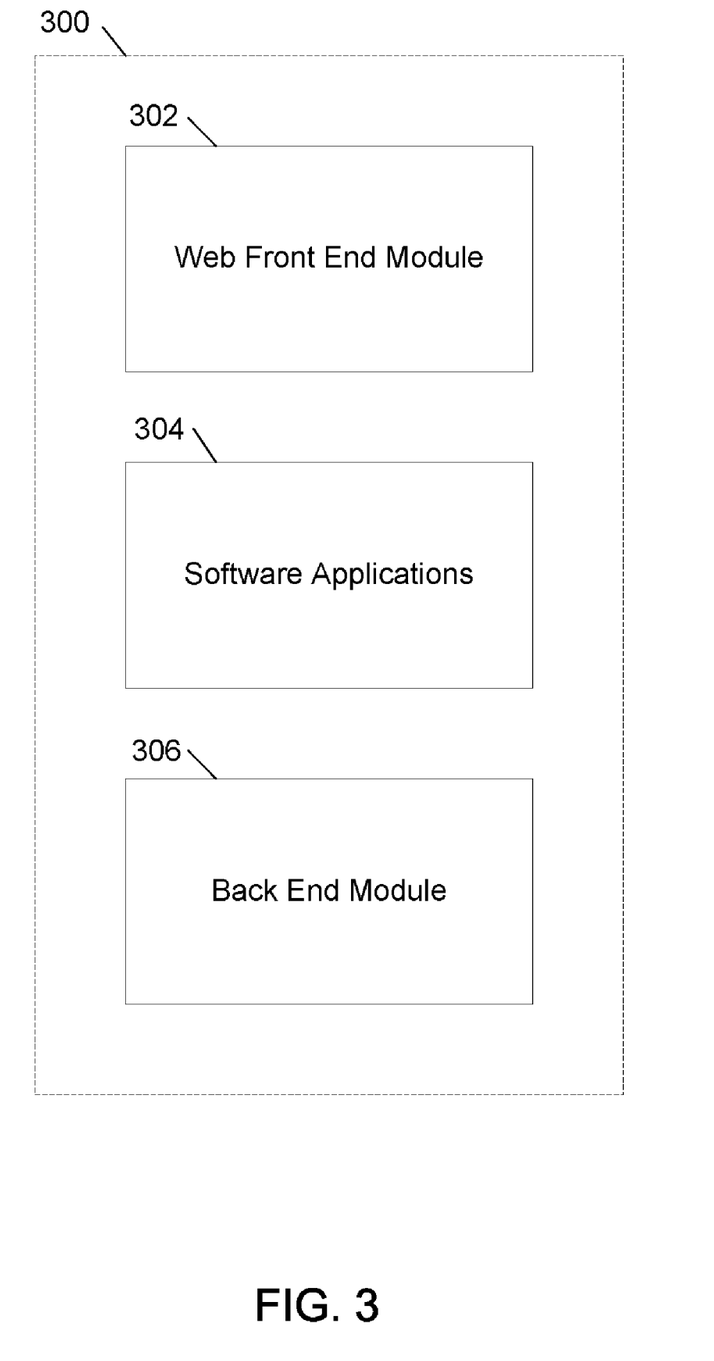
FIG. 3 shows example functional modules for a local server.

FIG. 3 shows some of the modules of an example local server 300. Included are web front end module 302, software applications module 304 and back end module 306. The web front end module 302 processes requests from clients to host software applications, makes a determination of where the software application is to be hosted and routes the software application to the appropriate destination. The local server may also host software applications 304 itself and therefore may also include back end module 306. The back end module 306 manages the execution of software applications 304 on local server 300.

Figure 4:
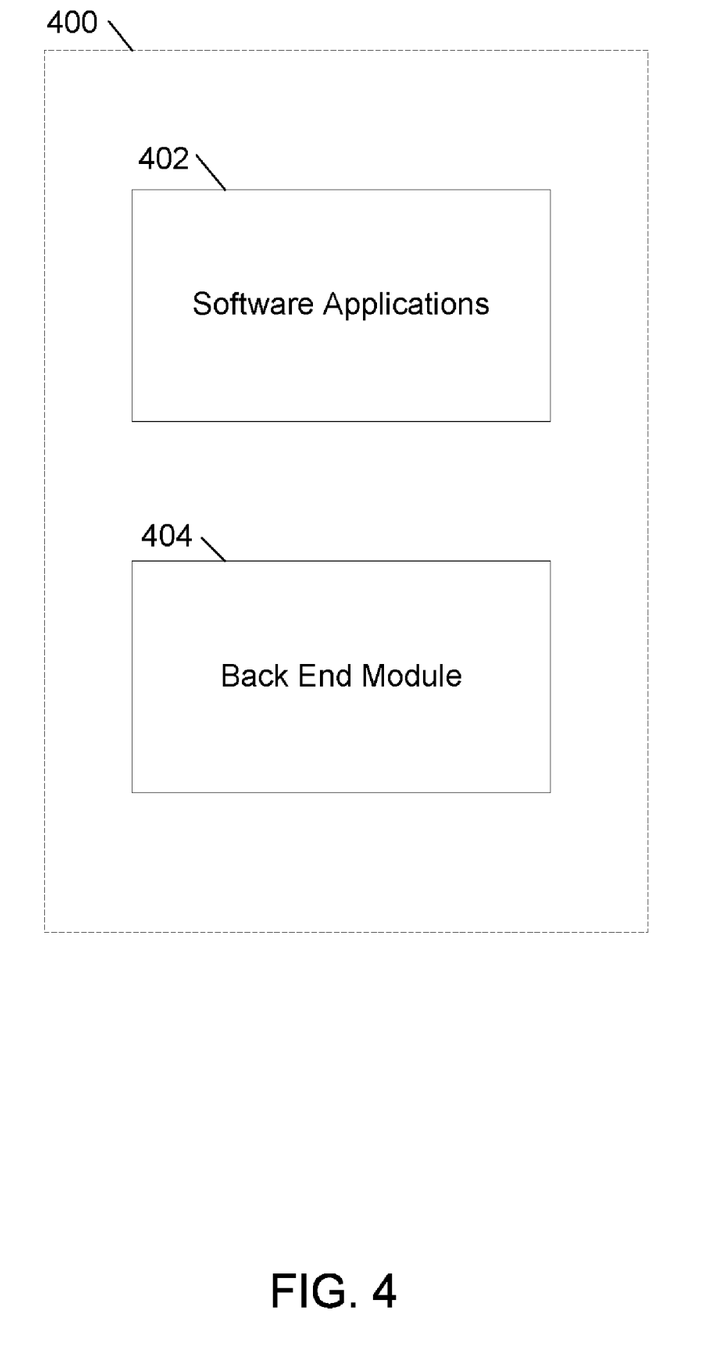
FIG. 4 shows example functional modules for a remote server.

FIG. 4 shows some of the modules of an example remote server 400. Included are software applications module 402 and back end module 404. Remote server 400 does not include a web front end and therefore does not have the software overhead associated with a web interface. Back end module 404 manages the execution of software applications 402 on remote server 400.

Figure 5:
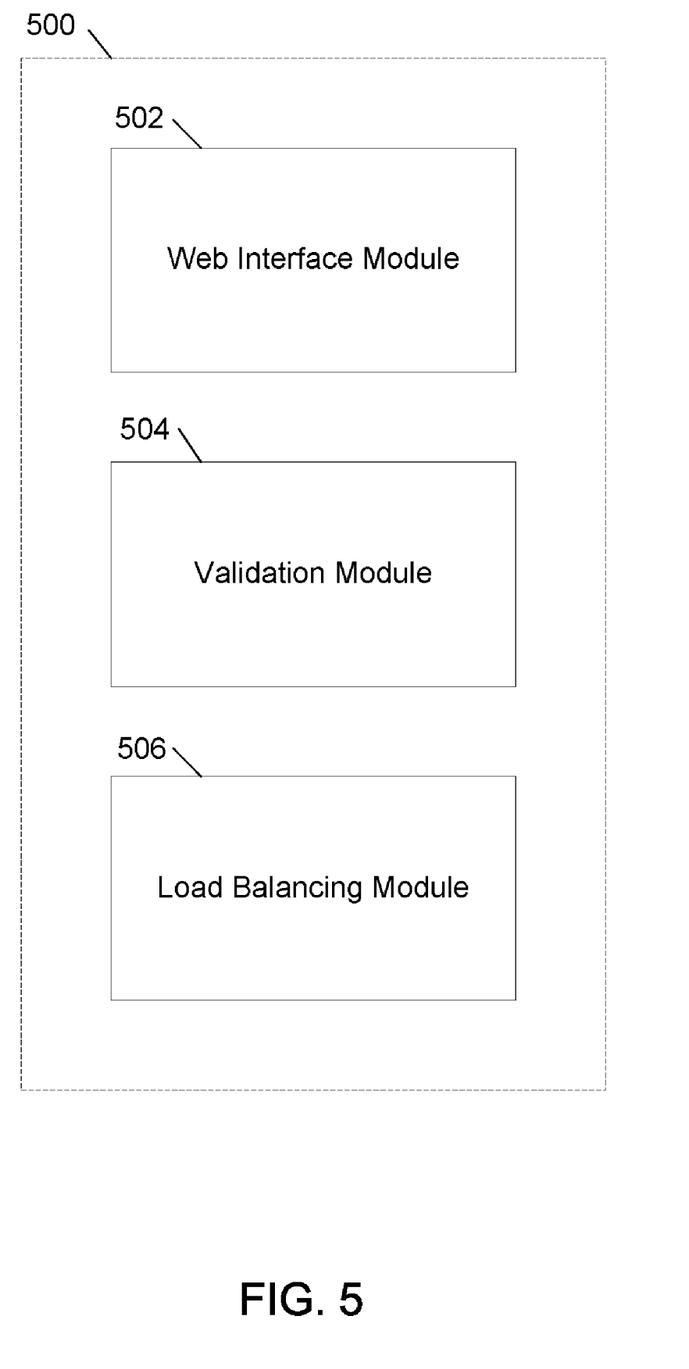
FIG. 5 shows example functional modules for an example web front end module of a local server.

FIG. 5 shows an example web front end module 500. Web front end module 500 includes a web interface module 502, a validation module 504 and a load balancing module 506. The web interface module 502 receives requests from clients to host application software and manages the assignment of where the software is to be hosted. The validation module 504 determines if the application software is safe to run and whether it should be permitted to be hosted on a server computer. For example, the validation module may check a list of known safe software applications and ensure that the software application to be hosted is on this list. The validation module also includes an extensibility feature that permits or allows customers to supply custom solution validators unique to their software application solution. In this way, if a customer identifies an area of their software application code they are concerned about, for example, security, they can provide custom validation logic to check security. According to an embodiment, such solution validators may be customized solutions or may be obtained from third party vendors.

The load balancing module 506 uses one or more algorithms to assign software applications to hosts in an efficient and scalable manner. In one example embodiment, a load balancing algorithm is based on the frequency of use of a software application. In this example, the load balancing module 506 keeps track of incoming requests, storing the solution type and where the software application is assigned to be hosted. A calculation is made on frequency of requests for each solution type for a specified number of requests. So, for example, if over the last 10,000 requests, solution type A comprised 60% of these 10,000 requests, if a new request is received for solution type A, the software application for this request is mapped to host computers according to the same distribution of host computers as for the previous requests for solution type A. Thus, the new request is more likely to be directed to a host computer that already hosts other applications using solution type A.

In another example embodiment, a load balancing algorithm assigns software application solutions to performance tiers based on the cost of usage. For example, solutions with the worst performance characteristics, as measured by their previous usage of resources, are routed to the lowest performance tier. Software application solutions are assigned a usage penalty based on performance so that the worst performing solutions become too expensive to run. This "washing out" of poor performing solutions encourages overall system health. In addition, because poor performing solutions share a tier with other poor performing solutions, any disruptions to service (i.e. a solution which is terminated because of poor performance) is isolated to impacting other poor performing solutions.

The load balancing mechanism is extensible. Customers can provide their own load balancing algorithm, based on a generic template that can tailor the load balancing more specifically to their needs.

As an additional means to ensure scaling in the hosting system, solutions are also load balanced using a hashing algorithm. The hashing algorithm identifies solutions and the load balancing module routes them to server computers based on this hash. For example, if a software application to be hosted represents a solution already hosted on a server computer, the hashing algorithm prevents the same solution from being hosted on another server. This reduces the overhead of having the same software application hosted on two different host computers.

Figure 6:
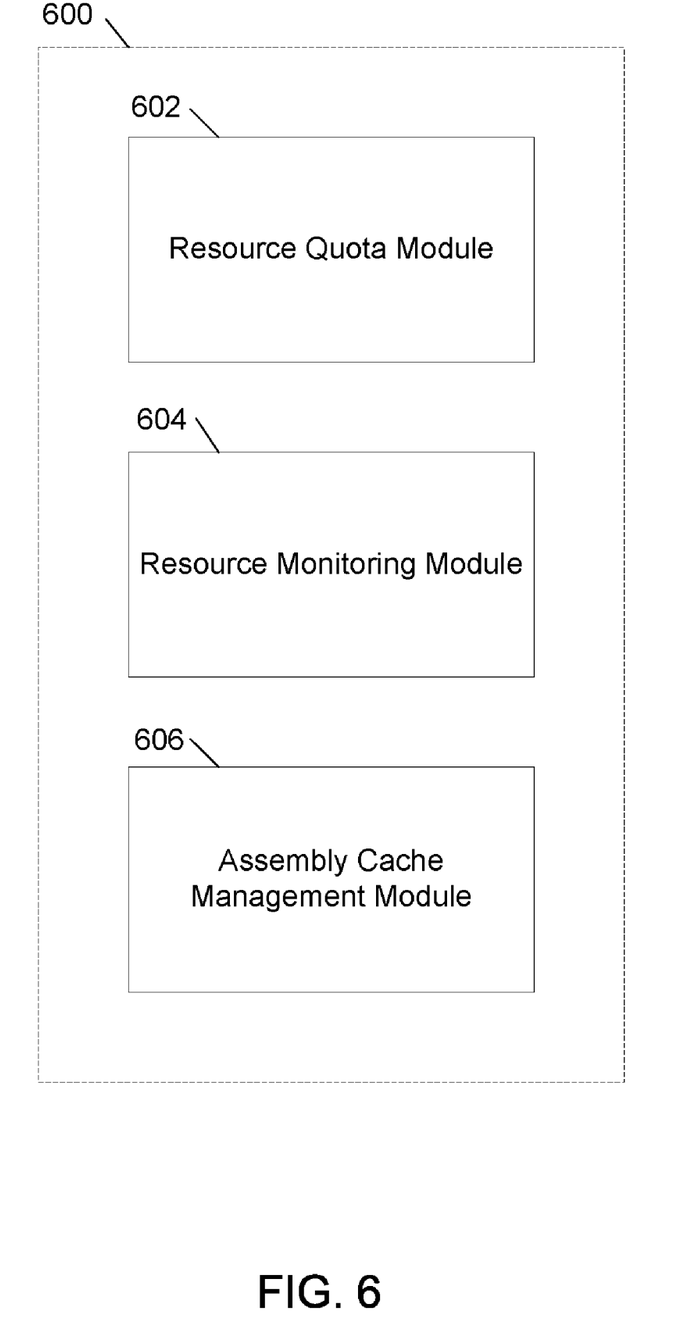
FIG. 6 shows example functional modules for an example back end module of a server.

FIG. 6 shows an example back end module 600. Back end module 600 includes a resource quota module 602, a resource monitoring module 604 and an assembly cache management module 608. The resource quota module 602 is used to track and charge system resources back to host sites. Because site administrators are penalized and solutions do not run if a site exceeds a resource quota, the site administrator is incentivized to ensure that the solutions they use are running properly. Server computers that host applications (host sites) are provided a resource quota for system resources such as CPU usage, database usage, memory usage, etc. and these resources are tracked against a daily allotted value. An example quota is presented to the user as a percentage of the daily allotted value of the most used resource. For example, if a solution uses 70% of its database resources and 60% of its CPU resources, the quota for the day is presented as 70% to the user.

The resource quota module 604 also provides for assigning thresholds that are used to determine when resources exceed specified limits. For example, a warning threshold may be set if a resource exceeds a specified warning threshold and a hard threshold may be set if a resource exceeds a resource quota. Use of example warning thresholds and hard thresholds may help an administrator regulate usage of custom solutions. For example, an alert may be issued if a resource exceeds a warning threshold, thereby helping an administrator avoid disabling solutions.

The resource monitoring module 604 monitors the resources used by software application solutions and determines whether resource quotas are exceeded. If a resource quota is exceeded, for example if a solution uses more than its quota of memory, the solution is terminated. The use of resource monitoring in this manner is a proactive way to prevent system problems. For example, if a process goes into an infinite loop so that it continues to run, potentially for hours on end, the use of resource monitoring will terminate the process before overall system performance suffers and before system resources become depleted.

The assembly cache management module 608 manages the installation and running of custom software applications from a client. Assemblies are containers of custom code. In the assembly cache management module 608, a host service process manages the assemblies of custom code and manages how that code should be run on a server computer. The assembly cache management module 608 ensures that an assembly is loaded onto a remote server when needed and unloaded when not needed. In addition, a worker process manages the actual execution of that code.

The back end module 600 is run in a sandboxed environment, using an isolated infrastructure, to ensure that the software applications are run in a secure manner. The worker process is created with a restricted security token that limits access to system resources and to other software applications. In this manner, the system impact of malicious application code is limited.

Figure 7:
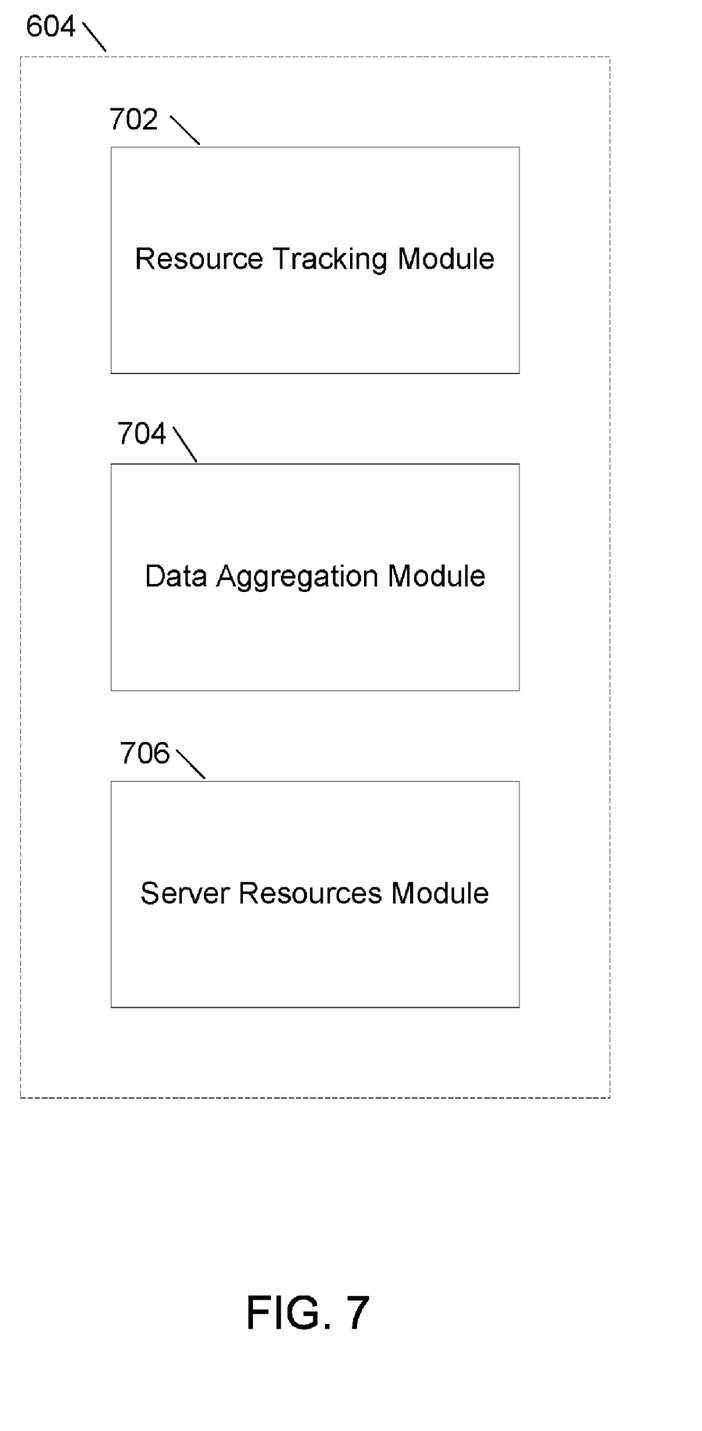
FIG. 7 shows the example functional modules comprising an example resource monitoring module.

FIG. 7 shows the example resource monitoring module 604 in more detail. The example resource monitoring module 604 includes a resource tracking module 702, a data aggregation module 704 and a server resources module 706.

The example resource tracking module 702 uses resource measures to track specific resource usage by solutions. A resource measure is a single facet of performance that is tracked. An example resource measure is CPU time. Another example resource measure is database server resource consumption. A third example resource measure is a count of the number of times a process has abnormally terminated (i.e. crashed). The resource tracking module 702 may track a plurality of resource measures. In addition, third parties may create their own resource measures for tracking application-specific or other resources.

For each resource measure, an administrator can assign a "hard threshold." A hard threshold expresses an absolute limit by which any usage would be immediately terminated. The use of a hard threshold can be used to detect problems such as solution code stuck in an infinite loop or a solution consuming a spiraling amount of memory. For example, for the resource measure of CPU time, an administrator could assign a hard threshold of 30 seconds. Any CPU usage that exceeded 30 seconds would be immediately terminated. In addition, the number of abnormal terminations may itself be a resource measure that can be tracked.

The example data aggregation module 704 aggregates local resource usage for a plurality of time intervals, using a tiered approach. To be responsive to system performance, resource data is stored for adjustable small time intervals (on the order of a minute). At the end of a specified number of these time interval (for example 60 time intervals, corresponding to one hour of time for a small time interval of one minute), the resource data is aggregated and submitted to a central database. Alternatively, instead of a time interval, resource data may be aggregated when the number of memory records reaches a configurable limit.

Using the tiered approach, at adjustable intermediate time intervals during the day (usually hourly), the resource data stored for the small time intervals is aggregated into new records which summarize resource usage for a solution or site collection over the intermediate time interval. The resource data for the small-time intervals are then deleted.

Finally, during a longer time interval (usually daily), the resource data for the intermediate time intervals is further aggregated into new records which summarize resource usage over the longer time interval. The resource data for the intermediate time intervals are then deleted. At the end of this longer time (example daily), net resource usage for a solution or for a site is calculated to determine if a resource quota has been exceeded.

The example server resources module 706 calculates a server resource metric that provides a normalized measure of maximum server resource usage for a collection of hosted solutions within a time period. In some embodiments, for example in MICROSOFT SHAREPOINT, a server may host one or more site collections, where a site collection is set of hosted solutions on a server that may have the same owner and share administrative settings. In these embodiments, the collection of hosted solutions above refers to a site collection.

Server resource usage is calculated based on the behavior of a collection of hosted solutions within a specific time interval, typically 24 hours. Within this time interval, all usage records for solutions for specific measured resources are collected. For each resource usage, the resource data is normalized by dividing the resource data by a resource per point factor that takes into account how a resource is measured. For example, if usage for one resource is tracked in milliseconds and usage for a second resource is tracked in seconds, a resource point factor of 1000 is assigned to the first resource. When the resource measured in milliseconds is divided by the resource per point factor of 1000, the resource usage is normalized.

The resource per point factor also lets an administrator prioritize various resources. For example, the resources per point factor for database server CPU usage may be higher that the resources per point factor for local machine CPU usage, reflecting that database server CPU usage is scarce. An administrator may calculate a normalized server resource value for each resource.

Normalized server resource usage is calculated for each hosted solution and then a maximum normalized server usage value is presented to the user and administrator as a representation of server resource usage for a collection of hosted solutions. Normalized server resource usage may be calculated for a resource by multiplying the resource per point factor by a resource usage value. For example, if the resources per point factor for database server CPU usage is 6 and the resources per point factor for local machine CPU usage is 1, 10 seconds of database server CPU usage is equivalent to 60 seconds of local machine CPU usage. For each resource in this example, the normalized server resource usage is 60 (6 multiplied by 10 seconds for database server CPU usage and 1 multiplied by 60 seconds for local machine CPU usage).

In another example, using the same resources per point factors, if database server CPU usage is 10 seconds and local machine CPU usage is 50 seconds, the normalized server usage value for the database server is 60 (6 multiplied by 10) and the normalized server usage value for local machine CPU is 50 (1 multiplied by 50). In this example, the maximum server resource usage value is 60. The administrators can then ensure that no one resource exceeds this maximum server resource usage value.

The example server resources module 706 also tracks the number of executions of a given piece of code and stores a usage count of these code executions. By dividing the normalized server usage value for a solution by the usage count, a measure of the relative performance of a given solution can be obtained.

Figure 8:
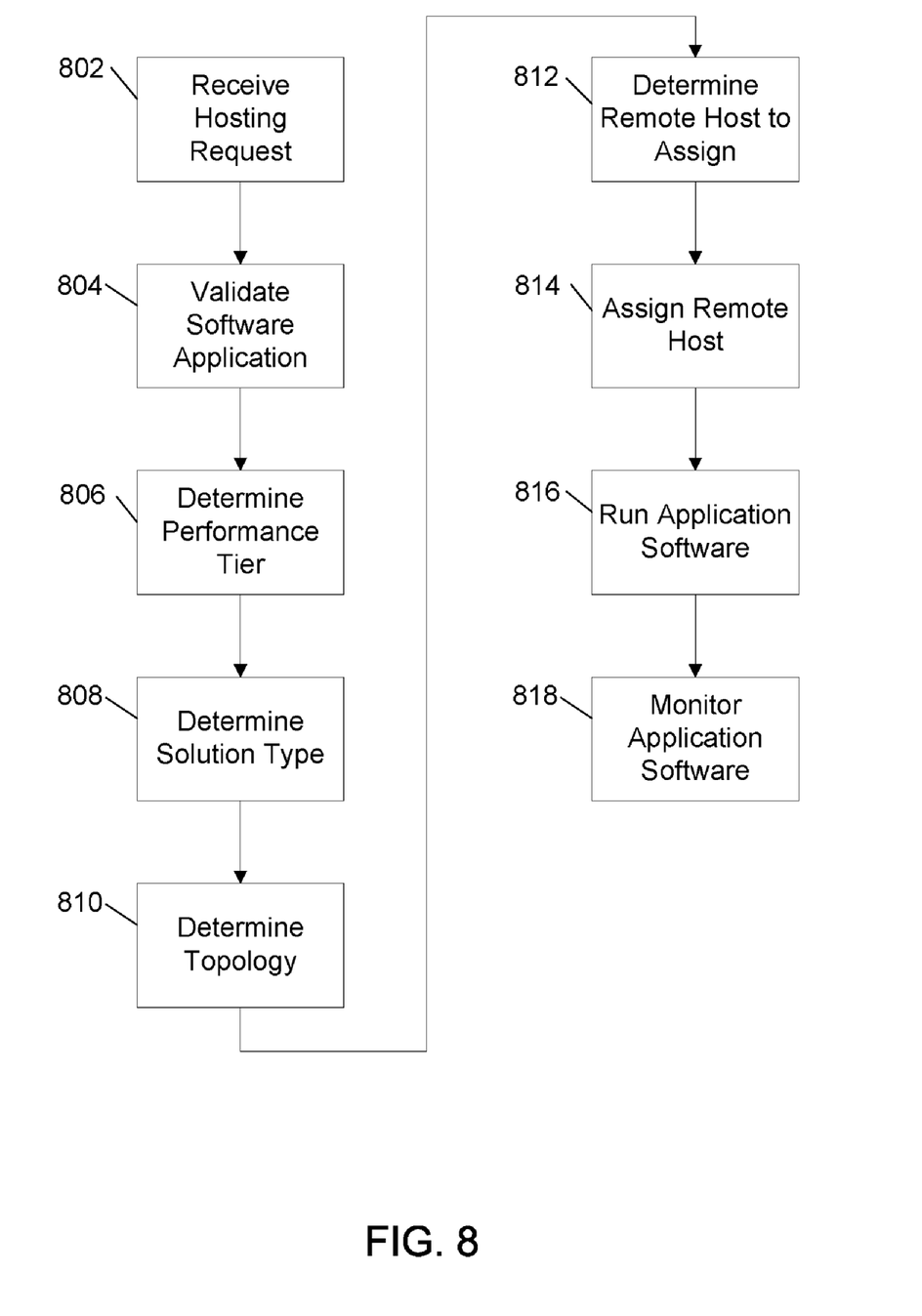
FIG. 8 shows a flow chart for an example method for hosting a software application on a server.

FIG. 8 is a flowchart showing an example method for hosting software applications on a server. At operation 802, a request to host a software application is received at a local server. An example is a user of Microsoft SharePoint who uploads a custom software application to a SharePoint site. At operation 804 the local server validates the application software, checking to make sure that it is safe to use on a server. For example, a software application may be validated by checking to make sure that it is on a safe list of software applications or by using a code-based validation program.

Once the software application has been validated, the local host makes a determination of which server should host the application software. This is a multi-operation process. First, at operation 806 a performance tier is determined for the software application. From an efficiency standpoint, it is best to host similar performing software applications on the same server. In this way, a poor performing application will not impact a faster running application on the same server. Next, at operation 808 a solution type is determined for the software application. It is also efficient and improves scalability to group similar applications together. In addition, it is important to know if a software application to be hosted is already hosted on the system. One way to make this determination is via a hashing algorithm that determines a unique hash value for each software application. If a request is made to host an application that has already been hosted, the hash numbers will match, informing the local server that this application has already been hosted.

Next, at operation 810 the local server obtains topology information from a configuration database to determine which software applications are hosted on which remote servers. At operation 812, the local server uses the performance tier, solution type and topology information in conjunction with a load balancing algorithm to determine which remote server, should host the software application. The result of this determination is that similar solution types and similar performing applications are grouped together. At operation 814, a remote server is assigned to host the application software based on this determination. It is also possible, based on the determination, that the software application could be hosted on the local server instead of a remote server.

At operation 816, the application software is run and at operation 818, the application software is monitored. Monitoring the application software comprises determining whether resource quotas assigned to the software are not being exceeded. If it is determined, that a resource quota is being exceeded, the software application is terminated.

Figure 9:
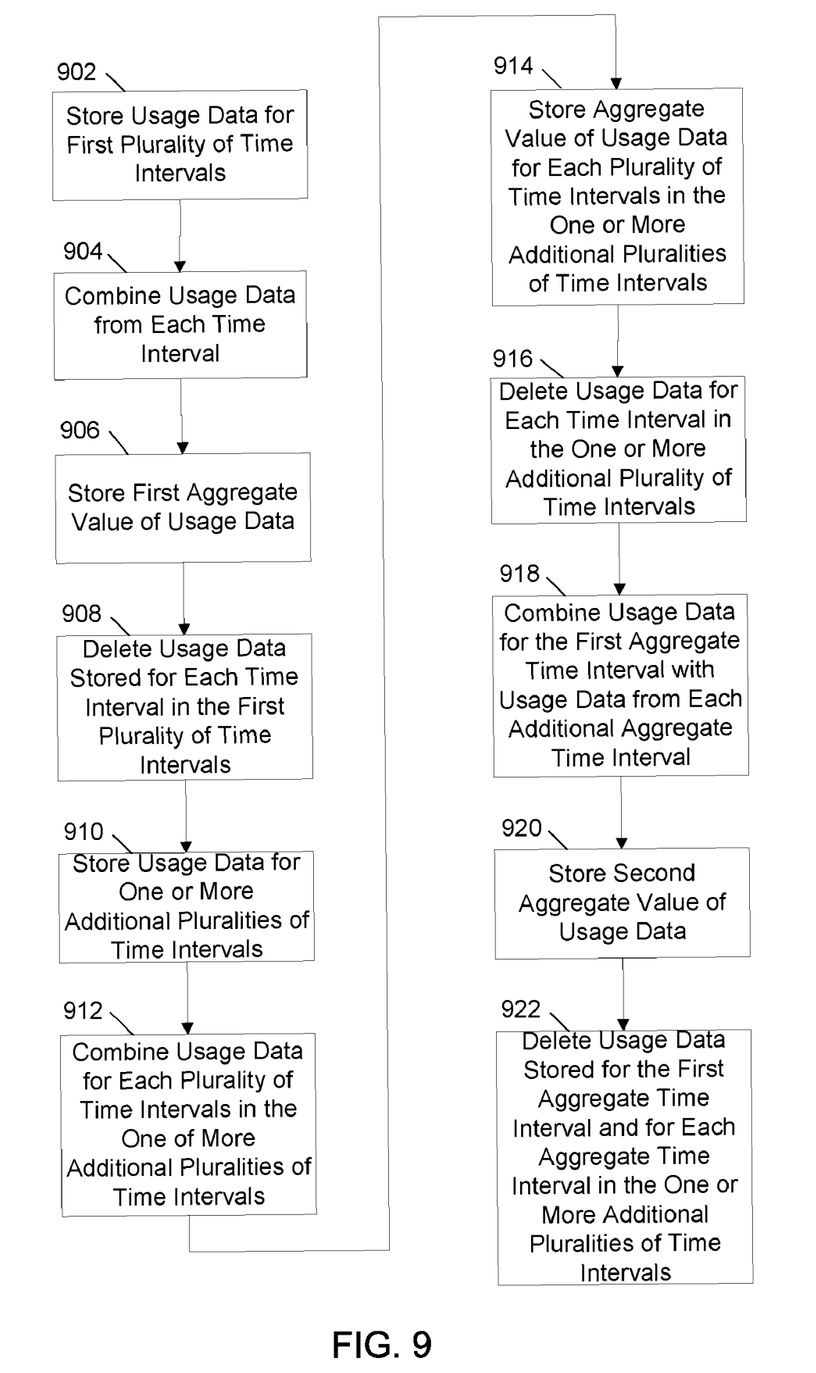
FIG. 9 shows a flow chart for an example method for aggregating monitored system resources for hosted user solutions on a server.

FIG. 9 is a flowchart for an example method for aggregating monitored system resources for hosted user solutions on a server. The method implements a tiered system of usage aggregation as a way to deal with and be responsive to large volumes of data. At operation 902, usage data for a system resource for a hosted server solution is stored for a first plurality of time intervals. The time intervals in first plurality of time intervals are typically short, on the order of one minute. A separate value of usage data is stored for each of the time intervals. At operation 904, the usage data from each time interval in the first plurality of time intervals is combined to produce and store a first aggregate value of usage data at operation 906. The first aggregate value of usage data is the sum of the usage data stored for each time interval in the first plurality of time intervals. For example, if a time interval is a minute and the first plurality of time intervals includes 60 time intervals, the first aggregate value of usage data represents usage data for one hour. Once the usage data is combined to produce the first aggregate value of usage data, the usage data stored for each time interval in the first plurality of time intervals is deleted at operation 908 in order to conserve system memory.

At operation 910, usage data is stored for one or more additional plurality of time intervals, a usage data value being stored for each time interval in the one or more additional plurality of time intervals. Each time interval in the one or more additional plurality of time intervals starts when another time interval in the one or more plurality of time intervals ends so that none of the time intervals in the one or more additional plurality of time intervals overlaps and so that each time interval in the one or more additional plurality of time intervals is different from each other. For example, if a time interval is a minute, one time interval may be from 9:00 to 9:01 and a second time interval may be from 9:01 to 9:02, etc. A usage data value is stored for each of these time intervals.

At operation 912, the usage data for each of the plurality of time intervals in the one or more additional plurality of time is combined to produce and store an aggregate value of usage data at operation 914. The aggregate value of usage data is the sum of the usage data stored for each of the plurality of time intervals in the one or more additional plurality of time intervals. For example, if a time interval is a minute and each of the one or more additional plurality of time intervals includes 60 time intervals, each aggregate value of usage data represents the usage data for one hour. Once the usage data is combined to produce the first aggregate value of usage data, the usage data stored for each time interval in the one or more plurality of time intervals is deleted at operation 916 in order to conserve system memory.

At operation 918, the usage data for the first aggregate time interval is combined with the usage data for each aggregate time interval in the one or more additional plurality of time intervals to store a second aggregate value of usage data at operation 920. The sum of the first aggregate time interval and each aggregate time interval of the one or more additional plurality of time intervals represents a second aggregate time interval. For example, if the first aggregate time interval represents an hour and the one or more additional plurality of time intervals equals 23 time intervals, each an hour in duration, the second aggregate value of usage data represents usage data in a 24-hour period. Once the usage data is combined to produce the second aggregate value of usage data, the usage data for the first aggregate time interval and for each aggregate time interval in the one or more additional plurality of time intervals is deleted.

In the example method above, the example first tier of system usage represents one minute, the next tier represents one hour and the final tier of system usage represents 24 hours. Other example tiers are possible.

Figure 10:
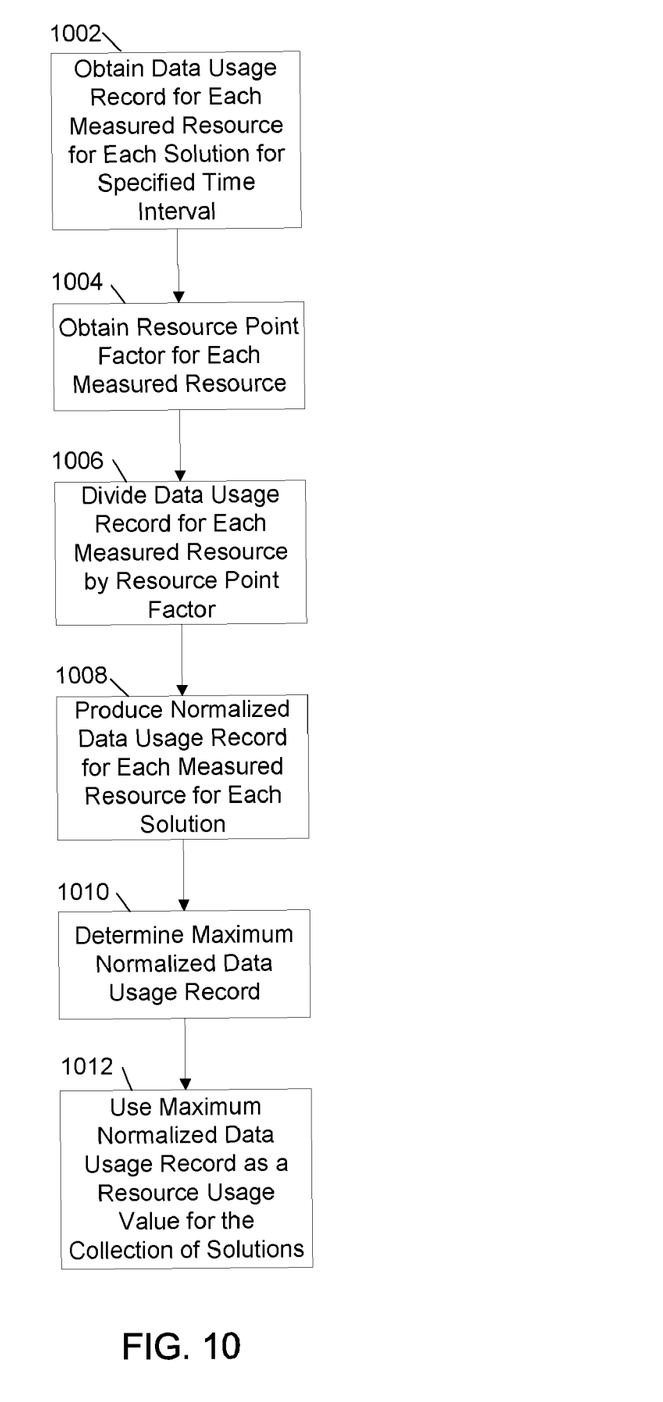
FIG. 10 shows a flow chart for an example method for determining resource usage at a server.

FIG. 10 is a flowchart for an example method for determining resource usage at a server. At operation 1002, a data usage record is obtained for each measured resource for each solution hosted on the server for a specified time interval. The data usage records obtained are stored during the course of aggregating data usage values, as discussed above. At operation 1004, a resource point factor is obtained for each measured resource for each solution. The resource point factor is typically designated by an administrator and is used to provide a normalized value for the measured resource.

At operation 1006, the data usage resource for each measured resource for each solution is divided by the corresponding resource point factor to produce a normalized data usage record for each measured resource for each solution at operation 1008. At operation 1010, the normalized data usage records for each measured resource solution are compared to determine a maximum normalized data usage record. At operation 1012, the maximum normalized data usage record is used as a resource usage value for the collection of solutions hosted on the server.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A resource management system for hosting of user solutions, the system comprising:
   one or more processors for executing computer executable instructions; and
   one or more computer storage media storing computer executable instructions that when executed by the one or more processors provide:
      a backend module for storing one or more custom user solutions, wherein each of the one or more custom user solutions are maintained in a sandboxed environment to limit potentially malicious software from impacting system resources;
      a resource tracking module that monitors one or more resource measures per user solution and that stores resource usage data for the one or more resource measures, wherein the resource usage data comprises one or more of memory usage and CPU usage;
      a data aggregation module that combines resource usage data for the one or more resource measures per user solution for a plurality of time intervals and that stores aggregations of resource usage for the one or more resource measures per user solution for the plurality of time intervals;
      a server resources module that calculates a metric of server resource usage for each of the one or more resource measures per user solution and that compares metrics of server usage for each of the one or more resource measures per user solution to determine a maximum metric of resource usage for a collection of solutions; and
      a resource quota module that assigns resource quotas for managed resources, wherein the resource quota module stores a warning threshold value for each measured resource, and wherein the resource tracking module issues an alert if a measured resource exceeds a warning threshold value.

2. The system of claim 1, wherein the resource quota module stores a threshold value for each resource that expresses an absolute limit by which the resource would be immediately terminated.

3. The system of claim 2, wherein the resource tracking module terminates a resource when the resource usage exceeds its threshold value.

4. The system of claim 3, wherein the resource tracking module stores a count of the number of terminations caused by exceeding the threshold value.

5. The system of claim 1, wherein the data aggregation module combines one or more sets of aggregated data into a larger set of aggregated data.

6. The system of claim 4, wherein the larger set of aggregated data is stored in a database.

7. The system of claim 1, wherein the data aggregation module deletes the one of more sets of aggregated data after they are combined into the larger set of aggregated data.

8. The system of claim 1, wherein the server resources module calculates a normalized metric for each resource usage.

9. The system of claim 8, wherein the normalized metric is calculated by dividing the resource usage by a resource point factor.

10. The system of claim 1, wherein the server resources module stores a metric that tracks the number of executions of user code corresponding to a specific user solution.

11. The system of claim 1, wherein the resource tracking module resets resource usage counts on a periodic basis.

12. The system of claim 1, further comprising a load balancing module that assigns software applications to hosts by grouping the software applications by resource usage using performance tiers.

13. The system of claim 12, wherein the grouping of software applications by resource usage is proportional to the resource usage of the software applications.

14. A method for monitoring system resources for hosted user solutions on a server, the method comprising:
 adding a hosted custom user solution to a site collection of hosted custom user solutions, wherein the hosted custom user solution is maintained in a sandboxed environment to limit potentially malicious software from impacting system resources;
 establishing, by one or more processors, for the site collection at least one quota for usage of a system resource, wherein the usage comprises memory usage;
 storing, by one or more processors, usage data for the system resource for the hosted custom user solution for a first plurality of time intervals, a usage data value being stored for each time interval in the first plurality of time intervals;
 combining the usage data for each time interval in the first plurality of time intervals to store an aggregate value of usage data for a first aggregate time interval, the first aggregate time interval equal to the sum of the first plurality of time intervals;
 determining, using the aggregate value, whether the site collection has exceeded a warning threshold for usage of the system resource; and
 in response to determining that the hosted solution has exceeded the warning threshold, sending a notification indicating that the warning threshold has been exceeded.

15. The method of claim 14, wherein the first aggregate time interval is one hour and the second aggregate time interval is 24 hours.

16. A method for determining resource usage at a server, the method comprising:
 adding a hosted custom user solution to a site collection of hosted custom user solutions, wherein the hosted custom user solution is maintained in a sandboxed environment to limit potentially malicious software from impacting system resources;
 obtaining a data usage record for each measured resource for each hosted custom user solution hosted on the server for a specified time interval, wherein the measured resources comprise one or more of memory usage and CPU usage;
 obtaining a resource point factor for each measured resource for each hosted custom user solution;
 dividing the data usage record for each measured resource for each hosted custom user solution by the corresponding resource point factor to produce a normalized data usage record for each measured resource for each hosted custom user solution;
 comparing the normalized data usage records for each measured resource for each hosted custom user solution to determine a maximum normalized data usage record; and
 using the value of the maximum normalized data usage record as a resource usage value for the collection of hosted custom user solutions hosted on the server in the specified time interval.

17. The method of claim 16, further comprising storing a usage count for each hosted custom user solution that represents the number of executions of user code for that solution during the specified time interval.

18. The method of claim 17, further comprising calculating a performance metric by dividing the normalized data usage record for each hosted custom_user solution by the usage count for each solution.

* * * * *